Nov. 5, 1968

F. G. SCHWESER 3,409,323

ONE PIECE INSERT BODY

Filed March 24, 1967

INVENTOR
Frederick G. Schweser

BY *Gustave Miller*
ATTORNEY

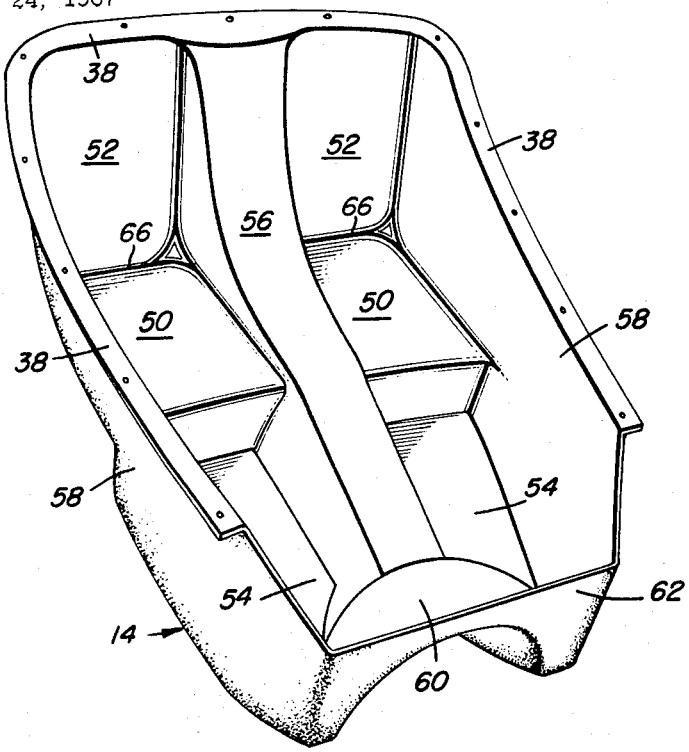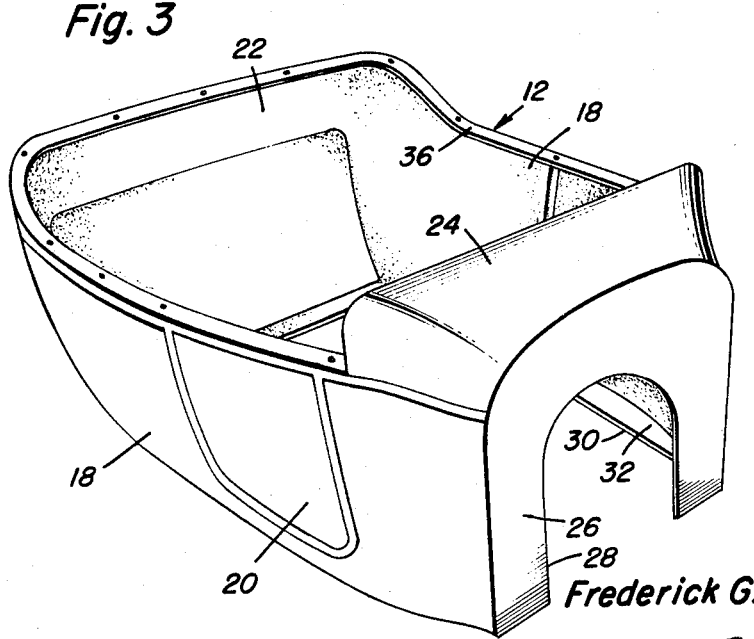

Nov. 5, 1968  F. G. SCHWESER  3,409,323
ONE PIECE INSERT BODY
Filed March 24, 1967  4 Sheets-Sheet 3
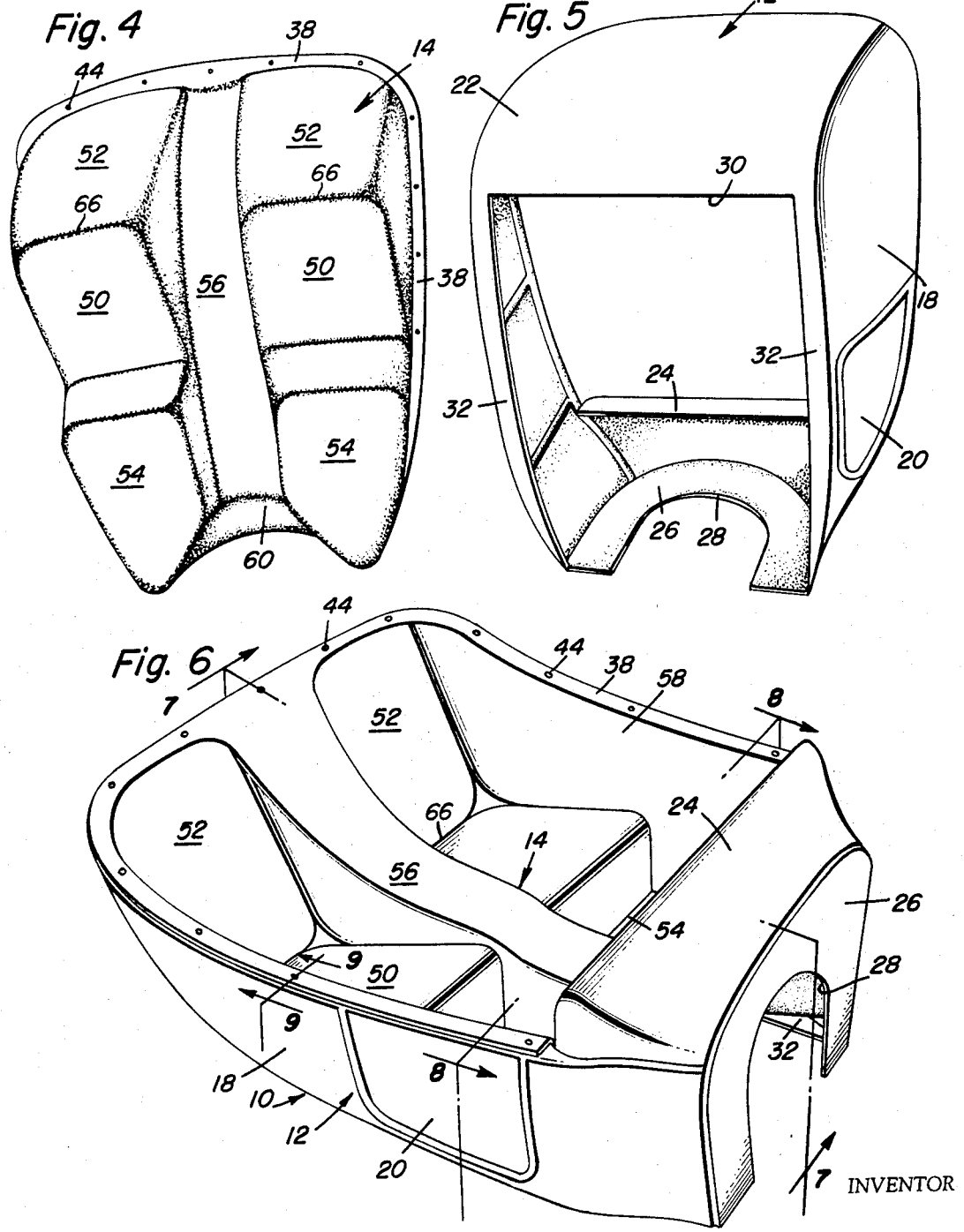
INVENTOR
Frederick G. Schweser
BY Gustave Miller
ATTORNEY Nov. 5, 1968   F. G. SCHWESER   3,409,323
ONE PIECE INSERT BODY
Filed March 24, 1967   4 Sheets-Sheet 4

INVENTOR
Frederick G. Schweser
BY *Gustave Miller*
ATTORNEY

United States Patent Office 3,409,323
Patented Nov. 5, 1968

3,409,323
ONE PIECE INSERT BODY
Frederick G. Schweser, c/o Bird Engineering, Box 427,
Omaha, Nebr. 68101
Filed Mar. 24, 1967, Ser. No. 625,644
4 Claims. (Cl. 296—28)

ABSTRACT OF THE DISCLOSURE

This invention is a one piece insert body, having integral walls, seat means and floor means for use in combination with a generally one piece roadster vehicle shell body of conventional construction, the roadster shell body and the insert body having complementary overlapping flanges which are secured together to keep the insert body secured in the roadster shell body. Quick and easy assembly of the insert body in the roadster shell body is one great advantage of this invention. It may be made of metal or fiberized glass reinforced plastic.

Background of invention

Generally one piece roadster shell bodies are well known, made of metal or fiberized glass reinforced plastic. These are generally sold in kit form, and the purchaser also buys separate seat parts, floor parts, upholstery parts, side wall materials in kit form, etc., to make up a finished roadster, in addition to a motor, chassis frame and wheels. The separate parts are both expensive, and very time consuming in assembling them in operative position to complete the roadster vehicle. This problem of assembling a number of different interior parts for the roadster vehicle is greatly simplified by this invention, wherein a one piece insert body is provided that is quickly and easily assembled into the conventional roadster shell body.

Brief summary of invention

This invention comprises a one piece insert body for easy assembly within a conventional generally one piece roadster vehicle shell body. The insert body is preferably of molded plastic reinforced by fiberized glass, or may be of one piece of integral metal. The insert body is integral, and generally provided with side and rear walls, and usually a front connecting fire wall, and has integrally molded seat members, which may be in the shape of bucket seats, but likewise may be a bench seat, and also has a floor in front of the seats between the side walls. The back wall and at least part of the side walls have a flange extending horizontally outwardly at an angle to the walls to overlap with the top edges of the side and back walls of the roadster shell body, or overlap inwardly extending flanges on the tops of such shell body walls and the insert body is secured to the roadster shell body along its flange, preferably by rivets, which rivets may also have snap fastener elements secured thereby for cooperating with complementary snap fastener element of a removable roadster top.

When assembled, the roadster shell body and insert body may be reinforced by having foam of suitable weight or fiberized glass, or mixture of both, blown therebetween, thereby substantially converting the assembled insert body and roadster shell body into an integral one piece unit.

Brief description of drawings

With the above and related objects in view, this invention consists in details of construction and combination of parts as will be more fully understood from the following description, when read in conjunction with the accompanying drawing, in which:

FIG. 2 is a top perspective view of the insert body of this invention.

FIG. 3 is a top perspective view of a roadster shell body into which the insert body of this invention is to be inserted.

FIG. 4 is a bottom perspective view of the insert body of FIG. 2.

FIG. 5 is a bottom perspective view of the roadster shell body of FIG. 3.

FIG. 6 is a top perspective view of the assembled insert body and the roadster shell body.

Detailed description of the invention

Figures 1, 9:
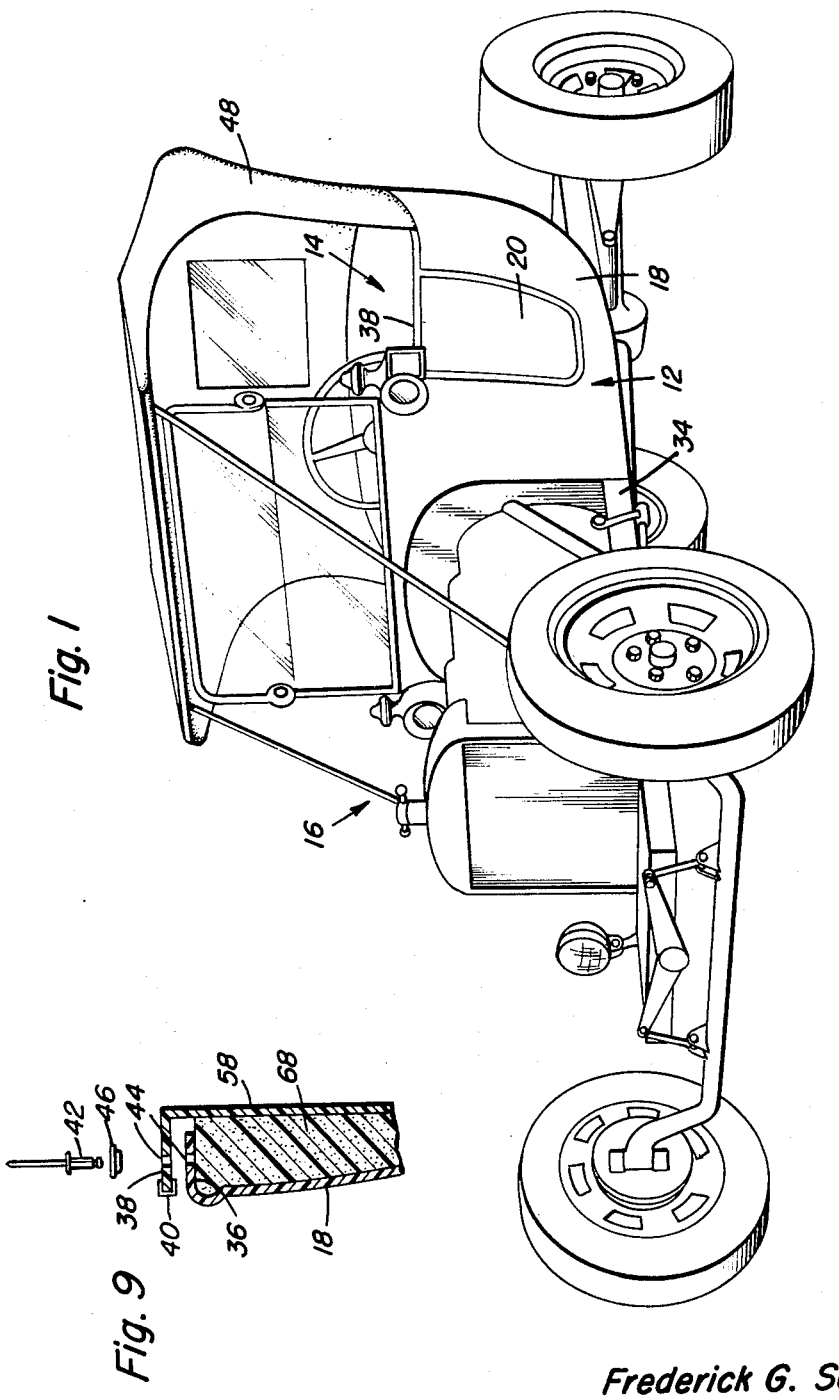
FIG. 1 is a perspective view of an assembled roadster vehicle having the insert body of this invention assembled therewithin.
FIG. 9 is an exploded sectional view, on a larger scale on line 9—9 of FIG. 6.

There is shown at 10 an assembled roadster shell body 12 and insert body 14, the insert body 14 constituting this invention for use in combination with the roadster shell body 12. The roadster shell body 12, with its assembled insert body is shown in a complete roadster vehicle 16, ready for operation, in FIG. 1. Except for the insert body 10, the roadster 16 is conventional. The generally one piece insert body 14, which is this invention, takes the place, in the roadster 16, of numerous separate individual pieces used by the usual assembler, such as seat upholstery and pieces, floor pieces, side and back wall pieces and upholsterery, etc., which must be laboriously assembled and fixed in position relative to each other and to the roadster shell body 12. It is this laborious assembly of many separate parts and pieces that is avoided by this invention.

The conventional roadster shell body 12 consists of a pair of side walls 18, which may be decorated by false doors 20, the side walls 18 being connected at the back by rear wall 22, and at the front by a cowling 24 and fire wall 26 cut out at 28 for the engine transmission to extend therethrough. The bottom is open at 30, and flanges 32 along the sides of the open bottom 30 extend inwardly from the side walls 18 and provide supports for securing it to the chassis 34 of the roadster 16. In addition, the back wall 22 and the side wall 18, as far as the cowling 24, is usually provided at the top edge with an inwardly extending horizontal flange 36 from which side wall upholstery is normally hung. All these details of the roadster shell body are conventional, and the one piece, usually molded insert body of this invention is intended for use in combination with this conventional roadster shell body 12.

The insert body 14 of this invention is normally of metal, preferably light weight, or preferably of a suitable plastic, possibly of the high impact type, suitably reinforced by impregnated fiberized glass, one form of which is on the market under the name "Fiberglas," but obviously, any fiberized glass or other suitable reinforcing fiber may be used. The insert body 14 is shaped to fit within and shaped closely enough to the shell body 12 that there will be enough contact points to completely support the insert body 14 within the shell body 12. The insert body 14 as here shown includes an outwardly horizontally extending flange 38 along the top of its back and side edges the same distance as the shell body flange 36, and is generally complementary thereto, overlapping the same and resting thereon when assembled together as in FIGS. 1 and 6.

A decorative smooth plastic channeled beading 40, as in FIG. 9, may be placed about the edge of the insert body flange 38, particularly if insert body 14 should be made of metal. The beading 40 is held in place by friction when the flange 38 of the insert body 14 is secured to the shell body flange 36 by suitable fastening means. One preferred means is by "pop" rivets 42 placed through aligned apertures 44 in shell body flange 36 and insert flange 38, and in addition, the "pop" rivets 42 also serve to hold snap fastener elements 46 in place thereon, for cooperation with complementary snap fastener elements suitably secured on a roadster removable top or roof 48. As thus riveted or otherwise secured together at their flanges, the insert body 14 and the shell body 12 are securely fastened together. Obviously, instead of providing the insert body 14 for home installation by the user, it may be factory installed, and thus in fact, be a complete one piece shell body and insert body all ready for mounting on a chassis, or may be factory assembled as a complete roadster 16. In any case, it greatly reduces the time and cost of the complete roadster over that with the conventional method.

The foregoing description of the insert body 14 is the essence of this invention, and the specific details of the insert body 14 may be varied. In one preferred form as shown, the insert body 14 is provided with a pair of bucket type seats 50, seat backs or connecting rear wall 52 and floor portions 54 separated by a center inverted channnel divider 56 and located between insert body side walls 58; the flanges 38 are integral with the top edges of side walls 58 of seat backs 52 and channel divider 56, the seats 50, floor portions 54 and divider 56 providing an insert body bottom. Obviously other conventional seat types may be used, such as a bench seat omitting the divider, or seats may be omitted altogether, the seat back merging directly into the floor, depending on the desires of the ultimate user. Portions of the floor or side walls may likewise be omitted. In the forward area, the seat portions 54 merge into a transmission cover portion 60, and this portion 60 and the side walls 58 are joined together by a fire wall 62 which fits under the shell body cowling 24 and against the shell body fire wall 26.

Figure 7:
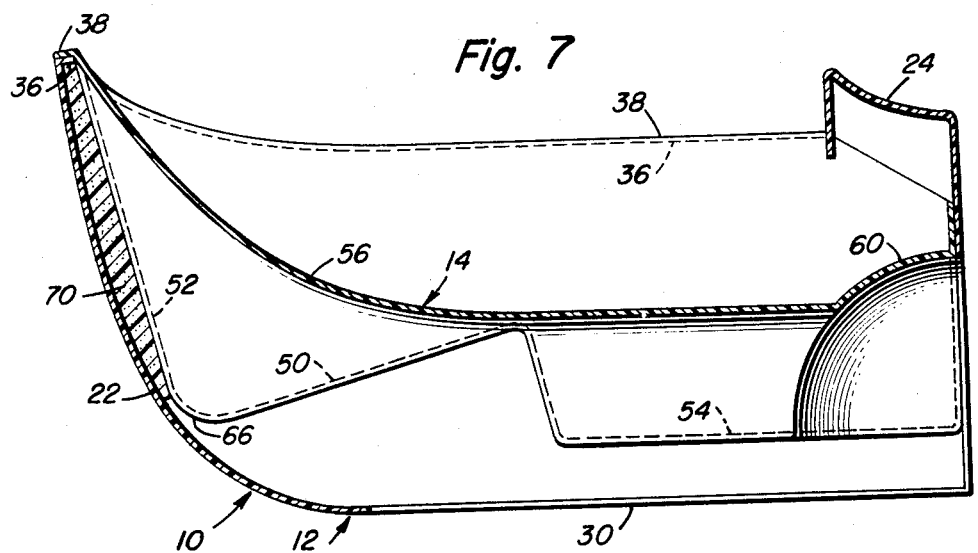
FIG. 7 and FIG. 8 are sectional views on lines 7—7 and 8—8 of FIG. 6.
Figure 8:
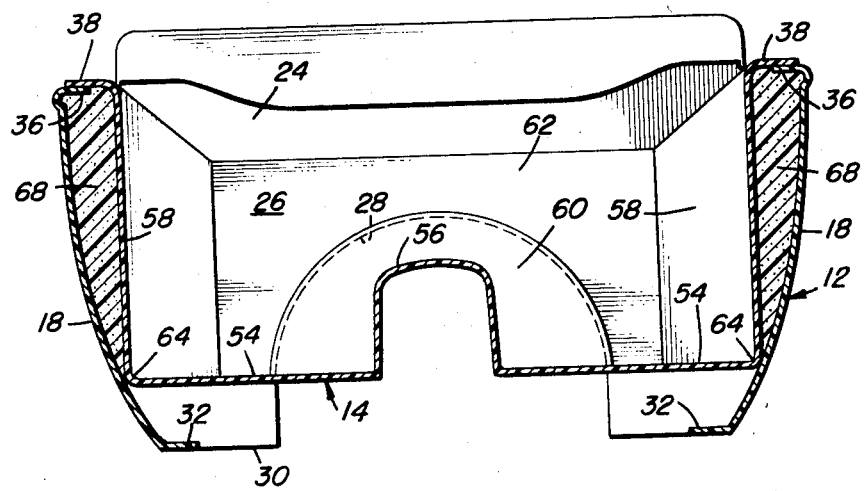

In addition to the support of the insert body 14 in shell body 12 furnished by the overlapping complementary flanges 36 and 38 secured together, the edge line 64 of insert side walls 58 with the adjacent portions of floor portions 54 bucket seats 50 and seat backs 52 may be made close fitting against the shell body side walls 18, as shown in FIG. 8, thus providing substantial additional support. However, the joining edge line 66 of seats 50 and seat backs 58 is slightly spaced from the shell body back wall 22, as shown in FIG. 7, thus providing some flexibility to the bucket seat 50 and their backs 52 and providing more comfort to the driver and passenger of the roadster 16.

To provide additional strength, yet without providing too much stiffness, the assembled insert body 14 and shell body 12 may be reinforced therebetween by blowing in a suitable plastic foam or fiberized glass, or a mixture of both. Such material may be blown in between the shell body side walls 18 and insert body side walls 58 as at 68 through an easily repairede temporary opening through either side wall or through the overlapping flanges 36 and 38. When the plastic foam sets, it unites the shell body 12 and insert body 14 into an integral one piece unit. In the back, ready access is provided through the inverted channel divider 56 from the bottom through the opening 30, for blowing in suitable foam 70 such as a cushioning styrofoam plastic, or fiberized glass, or a mixture of both. The material at 70, behind the seat backs 52 may be selected to cushion more readily. Styrofoam is particularly suitable for such purpose, or the fiberized glass is loosely packed, while the material at 68, between the side walls 18 and 58 may be harder and more tightly packed to provide more rigidity where such is desirable.

*Mode of operation of invention*

In operation, the insert body 14 of this invention, if of plastic, will be molded as an integral one piece insert body, preferably of a suitable plastic material reinforced by fiberized glass, to the desired shape, and including the desired type of seat or seats, floor portions, side walls, etc. As above pointed out, one or more of these various portions may be omitted, according to the desires of the user, as long as enough are included to make a completely operative insert body. Of course, supporting the insert body 14 in the shell body 12 is essential, and the overlapping flanges 36 and 38 secured together are the best way of doing this, but of course the blown in materials 68 and 70 between the insert body and the shell body, as described, may alone be enough to support the insert body 14 in the shell body 12. If the insert body is made of a suitable metal, the metal will be shaped and joined into an integral one piece insert body.

To asemble the insert body 14 in the shell body 12, the insert body 14 is merely placed down through the space between the side and back shell body flanges 36, pushed forward simultaneously under the cowling 24 and flanges 38 dropped into overlapping relation to the shell body flanges 36. If the flange apertures 44 are not preformed, they may be readily drilled in the flanges, using a template suitable to the spacing of the fastener elements in the edge of the cover 48. The "pop" rivets 42, with the fastener elements 46 therein, are then positioned through the aligned apertures 44 in the overlapping flanges, firmly securing the insert body 14 in the shell body 12 in a quick and easy manner. Then if desired, the material 68 is blown into place through an easily cut and easily repairable temporary opening in one of the side walls 18 or 58, and the material 70 is blown behind the seat backs 52 through the inverted channel divider 56. If no divider is present, a similar temporary opening may be provided.

In the drawings, like numbers refer to like parts, and for the purposes of explication, set forth below are the numbered parts of the improved insert body:

10—assembly of 12 and 14
12—roadster shell body
14—insert body
16—complete roadster vehicle
18—roadster shell body side walls
20—roadster shell body false doors
22—roadster shell body rear wall
24—roadster shell body cowling
26—roadster shell body fire wall
28—cut out in fire wall 26
30—open bottom
32—chassis cooperating flanges on bottom of side walls 18
34—chassis of roadster 16
36—inward flange of shell body 12
38—outward flange of insert body 14
40—channeled plastic beading on flange 38
42—"pop" rivets
44—apertures in flanges 36 and 38
46—snap fastener element
48—roadster roof
50—bucket seats
52—seat backs or rear wall of insert body 14
54—floor portions
56—inverted channel divider
58—insert body side walls
60—insert body transmission cover portion
62—insert body fire wall
64—joining edge line of 58 to 54, 50 and 52
66—joining edge line of 50 to 52
68—blown in material between 18 and 58
70—blown in material between 22 and 52
(50, 56 and 58 insert body bottom)

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In the combination with a roadster shell body (12) having side walls (18), a rear wall (22) and a forward fire wall (26), said shell body side walls (18) tapering inwardly in a downward direction, said shell body rear wall (22) connecting the rear ends of said shell body side walls (18) together, said shell body forward fire wall (26) connecting the forward ends of said shell body side walls (18) together; the improvement comprising a one-piece integral insert body (14) fitting within and supported by said roadster shell body (12), said insert body (14) having side walls (58), a rear wall (52) connecting the rear ends of said side walls (58) together, a forward fire wall (62) connecting the forward ends of said side walls (58) together, seat bottoms (50) and floor portions (54) connected to each other and to said insert body side wall (58) and extending inwardly from said insert body side walls (58), said seat bottoms (50) being connected to and extending forwardly from said insert body rear wall (52), said insert body rear wall (52) providing seat backs (52) for said seat bottoms (50), said insert body side walls (58) and said insert body rear wall (52) having a continuous outwardly extending flange (38) at their upper edges overlying on and being supported on the upper edges (36) of said side walls (18) and rear wall (22) of said roadster shell body (12).

2. The combination of claim 1, the further improvement of said insert body side walls (58) forming meeting edges (64) with said bottom floor portions (54) and with said seat bottoms (52), said meeting edges (64) resting on and being supported on the inner surface of said shell body inwardly tapered side walls (18).

3. The combination of claim 2 wherein the roadster shell body (12) has a cowling (24) extending from the top of its fire wall (26) over the forward top edges of its side walls (18); the further improvement of said insert body fire wall (62) having a transmission cover portion (60) extending rearwardly from said fire wall (62).

4. The combination of claim 3, and plastic material filling (68, 70) inbetween said side walls (18, 58) and rear walls (22, 52) of said shell body (12) and said insert body (14).

References Cited

UNITED STATES PATENTS

| | | | |
|---|---|---|---|
| 2,980,466 | 4/1961 | Barenyi | 296—24 |
| 3,084,973 | 4/1963 | Beckley | 296—31 |
| 3,107,649 | 10/1963 | Blend | 296—37 XR |
| 3,154,341 | 10/1964 | Booth | 296—24 |

BENJAMIN HERSH, *Primary Examiner.*

L. DANIEL MORRIS, Jr., *Assistant Examiner.*